350-6.7

E197A XR 3,531,785

Sept. 29, 1970 J. W. CORCORAN 3,531,785

HIGH-DENSITY STORAGE OPTICAL REGISTER

Filed Feb. 27, 1967

INVENTOR.
JOHN W. CORCORAN

BY

Fryer Tjensvold Feix & Phillips

ATTORNEYS 3,531,785
HIGH-DENSITY STORAGE OPTICAL REGISTER
John W. Corcoran, Redwood City, Calif., assignor to Technical Operations, Incorporated, Burlington, Mass., a corporation of Delaware
Filed Feb. 27, 1967, Ser. No. 618,860
Int. Cl. G11c *11/42*
U.S. Cl. 340—174 2 Claims

ABSTRACT OF THE DISCLOSURE

A high-density optical register for storing data in binary form wherein Kerr-magneto-optical material (magnetic film) having the property of changing its light reflecting characteristic with a change in its domain orientation is operatively associated with a coil driven by a photodiode whereby the domain orientation of the magnetic film can be controlled by a light beam, and the orientation of the beam can be determined by the reflection characteristics of the magnetic film in response to a light beam.

CROSS REFERENCES TO RELATED APPLICATIONS

Pat. application Ser. No. 537,453 of Buck et al., filed Mar. 25, 1966.

Pat. application Ser. No. 531,386 of Landre, filed Mar. 3, 1966, now Pat. No. 3,450,455.

BACKGROUND OF THE INVENTION

The present invention relates to high-density data storage registers for use with electronic computers having elements which exhibit two distinct and detectable physical characteristics, referred to as states, with the capability of changing from one physical characteristic to another within the period of several nanoseconds.

While there have been a wide variety of data storage devices developed and employed in connection with high-speed computers, the most popularly used cores at the present time are constructed as two or three-dimensional matrices of small (2 mm. diameter) toroids with wire passing through the hole in two or three directions. Under the influence of the proper biasing the cores are made to change from one magnetic state to another so as to represent one of two binary numbers. One of the more serious problems involved with cores of this general construction is the large number of wires which must be employed and the huge cables which such wires form when gathered together. When one considers that the number of toroids used in a single core runs into the thousands and that each toroid must be individually accessible through at least one separate wire, and often more, the number of wires eventually accumulated into a cable is significant and often makes it necessary for wires of substantial length to be employed. If one considers that an ordinary electrical cable has a propagation time of eight inches per nanosecond, it becomes clear that significant delays occur due to the cabling in computers built for operation at $10^8$ operations per second.

Because of the problem which is inherent in cabling, there has long been sought, and the present invention provides, a data storage means having a large number of data storage elements which can be controlled and accessed without requiring that an individual electrical conductor be associated with each such element for that purpose.

SUMMARY OF THE INVENTION

The present invention teaches means by which binary information can be entered into the register of a computer through a modulated beam of light and wherein the form in which the data is stored makes it recoverable through the use of a beam of light.

In the present invention data is stored in Kerr-magneto-optical material which exhibits two distinct characteristics of reflectivity depending on the orientation of its domains. Thus, the state of a register element is changed by changing its domain orientation. In order to change the state of a storage element, or interrogate the element to determine its state without requiring an elecritcal conductor extending to the element, each element has associated therewith a photodiode-coil circuit whereby light imposed upon the photodiode operates through its associated coil to establish a magnetic field which changes the domain orientation of the storage element. In order to interrogate the storage element without requiring a separate electrical conductor associated therewith, a light beam is impinged upon the surface of the magnetic film and the reflection of the beam examined to determine the domain orientation of the film and thus the state of the storage element which it forms. By forming a register with a large number of optical elements as described above, and by employing optical scanning systems such as those taught in assignee's patent applications referred to above, it is possible to construct a simplified data storage register capable of operating in the $10^8$ operations per second range while avoiding delays caused by the propagation time of electrical signals through wire conductors.

DESCRIPTION OF THE PREFERRED EMBODIMENT

Figure 1:
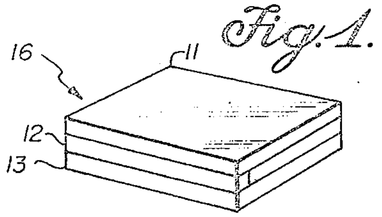
FIG. 1 is a diagrammatic representation of a single storage element of the present invention.
Figure 1A:
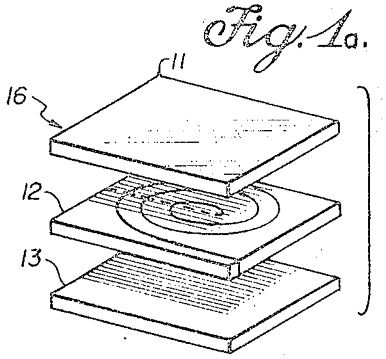
FIG. 1*a* is an exploded view of FIG. 1 showing the general relationship of the three main components of each such element.
Figure 2:
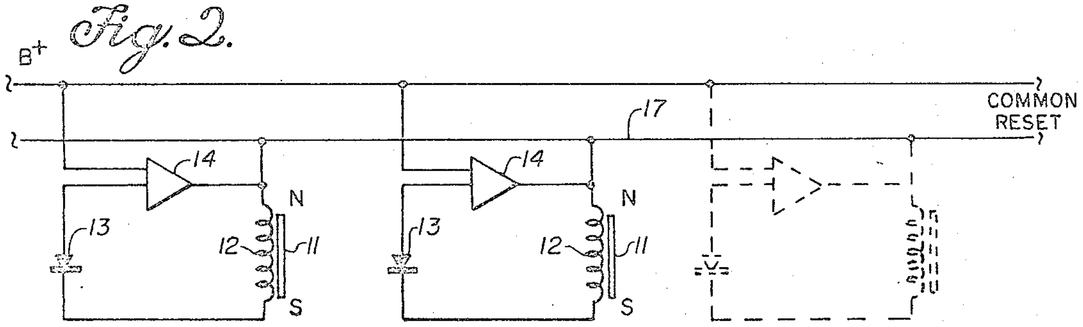
FIG. 2 is an electrical schematic of a plurality of storage elements forming a portion of a storage register.

Referring now to FIGS. 1, 1*a* and 2, small magnetic film elements 11 of the Kerr-magneto-optical material group form the main storage elements of the optical register of the present invention. These magnetic film elements are capable of assuming two different domain orientations (one defined as north and the other defined as south) which can be changed by the application of a magnetic field. In addition to being magnetically orientatable, the film elements 11 are also characterized by their reflectivity property which changes with a change in domain orientation. Thus, a light beam focused onto a film 11 when it is in one of its states (orientations) reflects differently than a similar beam focused on the element when it is in its other state.

Each magnetic film element 11 is associated with a separate electronic circuit comprising a coil 12 and a photodiode 13. The photodiode is characterized by the well-known property that it transforms light into electrical current. The electrical current is used to energize coil 12 and thereby establish a magnetic field for controlling the domain orientation of magnetic film 11. Thus, focusing a light beam on photodiode 13 operates to place the magnetic film 11 in one of its states. As best seen in FIG. 2, it may be necessary to employ an amplifier 14 in each photodiode-coil circuit in order to establish enough current through coil 12 to make sure that the magnetic film achieves the desired domain orientation.

Since the storage element 16 formed by film 11, coil 12 and photodiode 13 is capable of receiving information and delivering information through the medium of a light beam, all of the electrical conductors normally employed for performing those functions are eliminated. As seen in FIG. 2, a common reset line 17 and a common power B+ line are the only conductors which need to communicate with the register in its simpler form. Even in a more complex form conductors leading to the storage elements will normally be common to each of the elements, and thus the necessity of accumulating a huge cable of conductors is virtually eliminated.

To give some idea as to the density capabilities possible with the teachings of the present invention, it is contemplated that anywhere from 100 to 1,000 complete element circuits can be formed on a single one-inch square silicon chip (the photodiode being a silicon diode).

In operation a register is formed by a large number of individual elements 16 held together to form a planar surface which can be scanned by a modulated laser beam. As the beam scans the register, it is modulated to either energize or not energize a particular element 16, depending on the data which it is feeding to the register, and in this way causes the elements to assume one of their two states. When it is later desired to retrieve this information, the laser beam is used to scan the magnetic film surface of the register and the reflections from the film which are indicative of the state of the magnetic film, are examined to extract the stored data.

Figure 3:
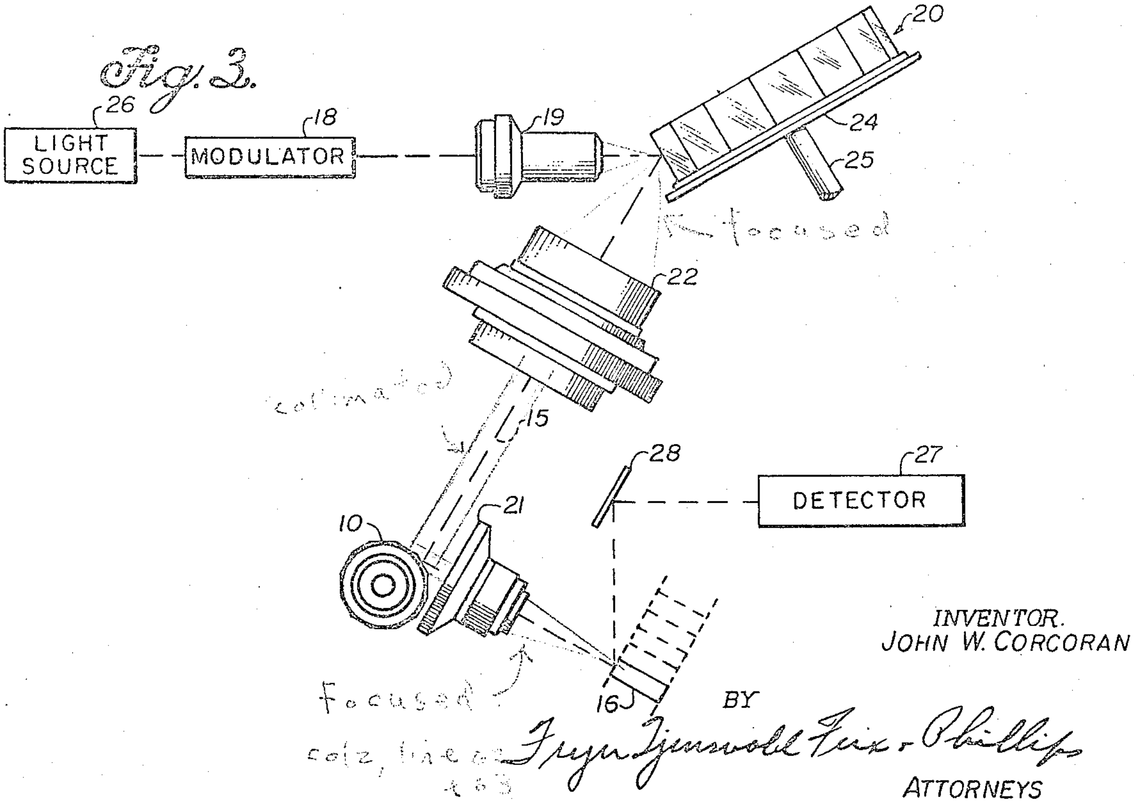
FIG. 3 is a generally schematic illustration of a possible scanning system for use in conjunction with an optical register as taught by the present invention.

FIG. 3 illustrates a possible scanning system which is fully described in the Buck et al. application referred to above. A laser beam from light source 26 passes through a modulator 18 and is focused by a lens 19 at the surface of a circle of prisms 20 which are, in effect, right-angle reflectors, and thence through a collimating lens 22 to produce the collimated beam of light indicated at 15 which impinges upon a rotating mirror 10. The reflectors 20 are mounted on a disc 24 supported on a shaft 25 for rotation by suitable power means. Thus, the focused beam from lens 19 is given a scanning motion by each right-angle reflector. The movements of reflectors 20 and rotating mirror 10 causes a beam to pass through lens system 21 in a scanning pattern which moves over each of the elements 16 during one complete scan. Thus, by proper operation of modulator 18 the beam 15 can be operated to energize selected photodiodes 13 and thus establish binary data into the register in such a manner as to represent data selected for storage.

The same scanning beam is also employed to interrogate the film elements 11 (as shown in FIG. 3) by use of a detector 27 which receives the reflected light beam from mirror 28. The state of each element is thus precisely known, and the data recovered.

While FIGS. 1 and 1*a* illustrate in a schematic form the general relationship of the three main components of a storage element 16, the actual physical form of such a component will vary depending on the manufacturing techniques employed and the particular use to which the element is ultimately to be put. Thus, when it is suggested above that the same light beam can be used to retrieve information from a register as is used to initially put the information into the register, it is contemplated that the physical form of the element 16 will be such that both the Kerr-magneto-optical film 11 and the diode 13 are accessible from the same side of the element. This can be accomplished by utilizing a diode 13 having a smaller surface area than that of film 11 such that a portion of the film 11 is exposed from the diode side of the element. Since the reflectivity characteristics of the film are generally uniform over its entire surface, the exposed portion would be all that is necessary to determine the particular state of the film at any given time.

Other physical arrangements of the element components are considered to be within the teachings of this invention to the extent that they maintain the same general electrical configuration as taught therein.

As described to this point, the present invention would be operated by effecting a common reset signal to place all of the storage elements in one state and then selectively impinging a light beam on some of the storage element control means (photodiode circuits) to change the state of those elements associated therewith. In this way a reflectivity pattern is established which corresponds to the data to be stored. This simplified form of the invention does not provide for selectively resetting a given storage element without also resetting the other elements. Operation along these lines is not, however, beyond the scope of this invention, and requires only that the control circuit include means for reversing the polarity of the field established in response to a light beam being impinged thereon. There are several well-known circuits capable of performing this function, the most common being a simple flop-flop circuit. The addition of such a circuit would operate to alternate the polarity of the field established by a coil 12 in response to current from diode 13 and thus reverse the polarity of the domain orientation of its associated storage element 11—thereby selectively changing the state of the storage element without affecting the state of the other elements of the register.

It will be observed by those familiar with the optical art, and the photographic art in particular, that the storage elements of the present invention form an electrical analogue of a photographic film in that they include a photo-detector, a storage element, and an amplifier circuit by which the detector and storage element are operatively associated. While the use of optical read-in and optical read-out devices are not by themselves new, the combination of optical read-in and read-out in the same device has not been known prior to the present invention, at least in a form capable of comprising a high-density storage system for an electronic computer capable of $10^8$ operations per second and more.

I claim:

1. An optical register comprising in combination:

a plurality of information storage elements each of which exhibits two detectably different responses to impinging light depending on its state, said storage elements including Kerr-magneto-optic material which is characterized by a change in reflectivity with a change in domain orientation;

storage element control means associated with each of said storage elements and responsive to a beam of light being impinged thereon to change its associated element from one of its states to another of its states whereby the reflectivity of said element is changed, said control means including a magnetic field generating means which establishes a field which interacts with said Kerr-magneto-optic material whenever a light beam is impinged on said control means; and read-in light beam scanning means operatively disposed to scan a light beam over each storage element control means and including modulating means for varying the intensity of the beam as it is scanned so as to effect a change of state of some of said elements and not affect others.

2. The register of claim 1 further comprising:

read-out light beam scanning means operatively disposed to scan a light beam over said storage elements and including detector means disposed to receive the light beam reflection off of said elements and distinguish between reflections from an element in one of its states and a reflection from that element when in its other state.

References Cited

UNITED STATES PATENTS 3,219,235 5/1967 Chang et al. ________ 340—174
3,142,720 7/1964 Adams ______________ 88—61

3,368,209 2/1968 McGlauchlin ______ 340—174.1
3,293,655 12/1966 McNaney __________ 250—219
3,424,908 1/1969 Sitter ______________ 250—206

BERNARD KONICK, Primary Examiner

K. E. KROSIN, Assistant Examiner

U.S. Cl. X.R.

250—206, 219; 350—151